April 6, 1937. Ö. RISZDORFER 2,076,481
PHOTOGRAPHIC CAMERA FOR DETERMINING THE EXPOSURES
Filed Oct. 11, 1933
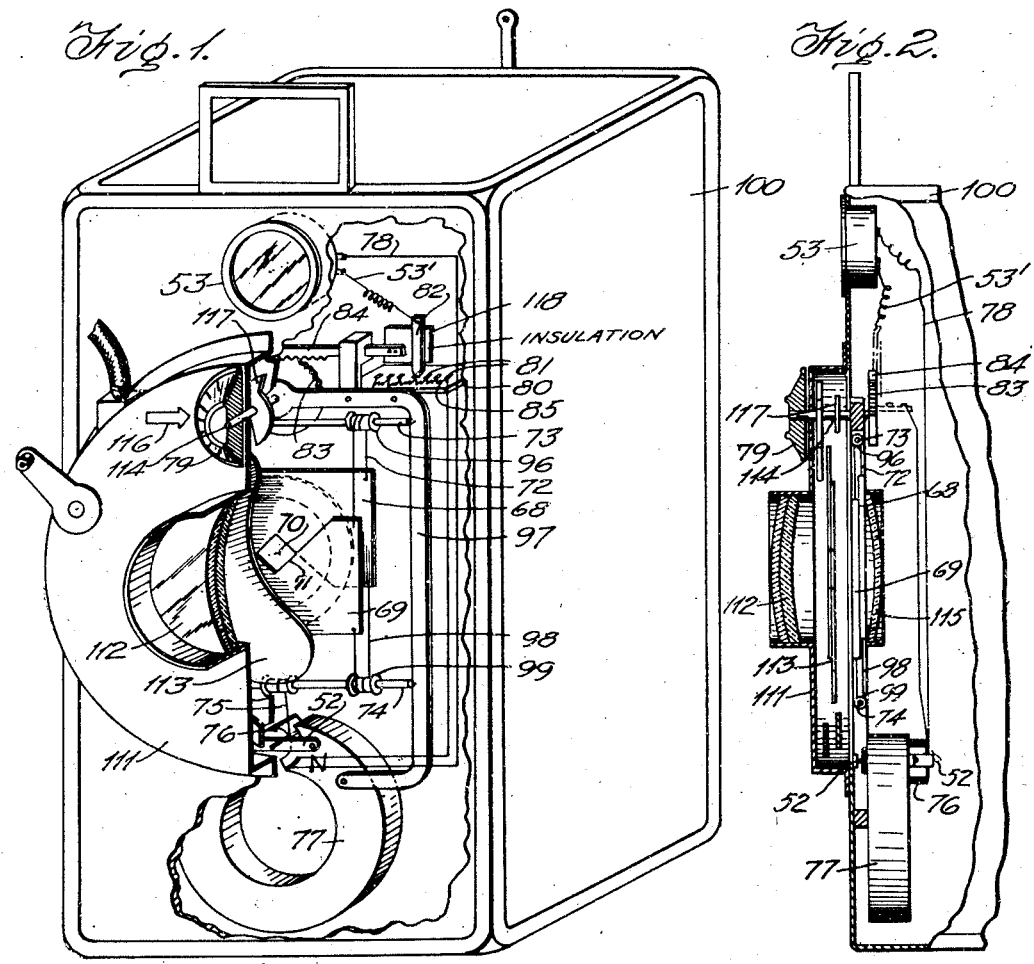
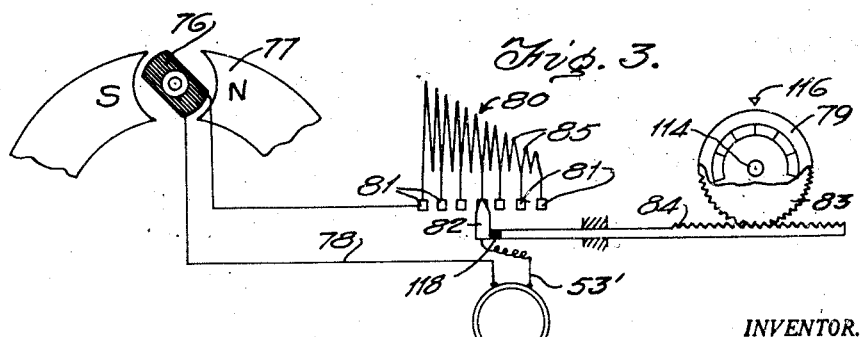
INVENTOR.
Ödön Riszdorfer,
BY
Frank Appleman
ATTORNEY Patented Apr. 6, 1937

2,076,481

UNITED STATES PATENT OFFICE 2,076,481

PHOTOGRAPHIC CAMERA FOR DETERMINING THE EXPOSURES

Ödön Riszdorfer, Budapest, Hungary

Application October 11, 1933, Serial No. 693,204
In Hungary October 15, 1932

6 Claims. (Cl. 95—10)

This invention relates to improvements at the shutter of photographic cameras, according to which the quantity of light falling upon the sensitive surface can be set by two means, viz, the diaphragm and the shutter-velocity. The invention has proceeded from the consideration that it is not a matter of indifference whether when exposing one chooses a longer period and a smaller diaphragm, or a shorter period and a larger diaphragm. The ordinary exposure-timers are constructed and tables drawn up on the assumption that photographs of an object taken with the same exposure are equally good if $$J.T = \text{constant},$$

where J signifies the quantity of light admitted as controlled by the diaphragm and T the time of exposure. Schwarzschild has shown in his sensitometric researches that the photochemic effect varies with the combined values of J and T; and he has established that the following formula:

$$J.T^p = \text{constant}$$

is correct, where the exponent —$p$—, which is termed in the literature of the subject the Schwarzschild exponent, alters its value according to the nature of the sensitive material, and thus in general possesses different values with different emulsions. It has been shown that an exposure of 1 sec. with 1000 metric candles has a photochemical effect entirely different from that of an exposure of 1000 secs. with one metric candle.

The invention relates to an arrangement at the shutter of photographic cameras, with which the amount of light falling in upon the sensitive surface is fixed in such a manner, with the aid of a photocell, that the intensity of the current from the latter is influenced by means in positive connection with one of the two organs (diaphragm and shutter) regulating the amount of light passing through the objective, whereby this connection is so formed, that the two controlling values J and T are combined in accordance with the above statements. In the device one of the two controlling organs (diaphragm or shutter) is adjusted at will, upon which the current from the photocell either adjusts the second organ immediately, or shows by means of an indicator the value to be set.

In all forms of the invention the positive connections of the two setting means are arranged in accordance with the Schwarzschild exponent.

In the accompanying drawing, like characters of reference indicate like parts in the several views, and:

Figure 1 is a perspective view of one form of the invention, the device being partly broken away and in section to fully disclose the structure.

Figure 2 is a vertical section of the front part of a camera embodying this invention, the section plane being the vertical plane containing the optical axis of the camera.

Figure 3 is a semi-diagrammatic view disclosing the wiring arrangements.

The drawing discloses one embodiment of the invention wherein one of the means controlling the exposure, viz, the adjusting-disk of the shutter, indirectly, during its displacement, influences the photocell circuit in accordance with the Schwarzschild exponent, and the current from the photocell influences the aperture of the objective-diaphragm. In this embodiment this diaphragm consists of two plates 68 and 69, which are reciprocally movable and carried in a straight path and in each of which a triangular aperture 71 is provided, the two apertures forming a quadrangular diaphragm-opening. The two diaphragm-parts 68 and 69 are operated by bands 72. For this purpose the two upper corners of the plates 68 and 69 are connected with each other by a band 72 each and the bands are wound over pulley-wheels 96 on a shaft 73, which rotates in the frame 97. In just the same way the bands 98 of the lower corners of the plates 68, 69 are wound about pulley-wheels 99 mounted on the shaft 74. This shaft is supported by the frame 97. The lower shaft 74 is driven by means of the band 75 from the armature 76 of a d'Arsonval electric armature, rotatively mounted between the poles S, N of the horseshoe magnet 77 in the bracket 52. The armature 76 lies in the circuit 78 of the photocell 53. In a series with the latter is a resistance, whose windings are connected to the contacts 81. On these locally fixed contacts the contact 82 of the rack 84 slides; the rack 84 meshes with a gear 83 on the adjusting-disk 79 of the shutter of the camera. The disk 79 and the contact 82 are of conducting material.

The contacts 81 are connected to such points of the resistance 80 that the successive sections defined by the contact connections are graduated in resistance, this being indicated in Fig. 3 by the graduated lengths of the windings 85. These successive resistance steps are graduated in accordance with the requirements essential to maintain the proper relation between the diaphragm opening and shutter speed in conformity with the Schwarzschild exponent.

As will be seen from Fig. 1, the parts just described are protected by a camera casing 100 having a front housing 111 except that the shutter speed indicator 79 is mounted on the outside of the housing and is connected to the gear 83 by a shaft 114. The camera is also provided with the usual shutter which is shown at 113. For the sake of completeness of illustration, although these parts form no elements of the present invention, the front lens 112, rear lens 115 and shutter cam are also shown.

Furthermore, an index pointer 116 is shown for the speed setting disk 79 and it will be seen that the rack 84 is shown as insulated from the contact 82, the latter having direct connection to the photo-cell 53 through the wire 53'.

When the shutter speed disk 79 has been adjusted, the current from the photocell 53 automatically sets the diaphragms 68, 69 at a value which in consequence of the suitable gauging of the resistance 80 corresponds with the equation $$J.T^p = \text{constant}.$$

What is claimed is:

1. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm regulating the effective size of the lens opening, an operative connection between the rotatable member of the electro-magnetic means and said diaphragm, and an operative connection between the contact member and disk to move the former as the latter is rotated.

2. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm regulating the effective size of the lens opening, an operative connection between the rotatable member of the electro-magnetic means and said diaphragm, and an operative connection between the contact member and disk to move the former as the latter is rotated, said contact member being brought into conductive relation with said resistance at spaced points along the resistance, the spacing of said points varying in accordance with Schwarzschild's exponential law.

3. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm comprising a pair of plates movable one over the other and having opposed notches in their overlapping edges forming a diaphragm opening to regulate the effective area of the lens opening, means to cause simultaneous movement of one plate as the other is moved, an operative connection between one of said plates and the rotary member and moving the plate as the member rotates, and an operative connection between said contact member and said disk.

4. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm comprising a pair of plates movable one over the other and having opposed notches in their overlapping edges forming a diaphragm opening to regulate the effective area of the lens opening, means to cause simultaneous movement of one plate as the other is moved, an operative connection between one of said plates and the rotary member and moving the plate as the member rotates, an operative connection between said contact member and said disk, a rack carrying said contact member, and a gear rotating with said setting disk and meshing with said rack.

5. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm comprising a pair of plates movable one over the other and having opposed notches in their overlapping edges forming a diaphragm opening to regulate the effective area of the lens opening, means to cause simultaneous movement of one plate as the other is moved, an operative connection between one of said plates and the rotary member and moving the plate as the member rotates, and an operative connection between said contact member and said disk, said contact member being brought into conductive relation with said resistance at spaced points along the resistance, the spacing of said points varying in accordance with Schwarzschild's exponential law.

6. In a camera having a lens opening and a variable speed shutter, a shutter speed setting disk, a photo-electric cell, an electro-magnetic device including a rotatable member varying in position in accordance with the degree of energization of said electro-magnetic means, a resistance, a contact member movable along said resistance for connection to spaced points thereon, conductive connections connecting said cell, electro-magnetic means and resistance in series and connecting said contact member to said cell, a diaphragm comprising a pair of plates movable one over the other and having opposed notches in their overlapping edges forming a diaphragm opening to regulate the effective area of the lens opening, means to cause simultaneous movement of one plate as the other is moved, an operative connection between one of said plates and the rotary member and moving the plate as the member rotates, an operative connection between said contact member and said disk, a rack carrying said contact member, and a gear rotating with said setting disk and meshing with said rack, said contact member being brought into conductive relation with said resistance at spaced points along the resistance, the spacing of said points varying in accordance with Schwarzschild's exponential law.

ÖDÖN RISZDORFER.